Nov. 25, 1969    A. BONNET    3,480,142
METHOD AND APPARATUS FOR PNEUMATICALLY
SEPARATING SOLID PARTICLES
Filed Nov. 28, 1966    4 Sheets-Sheet 4
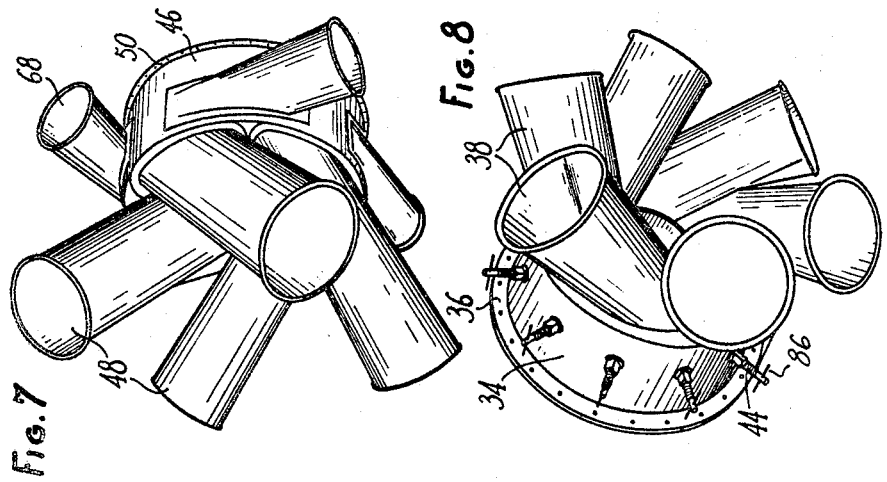
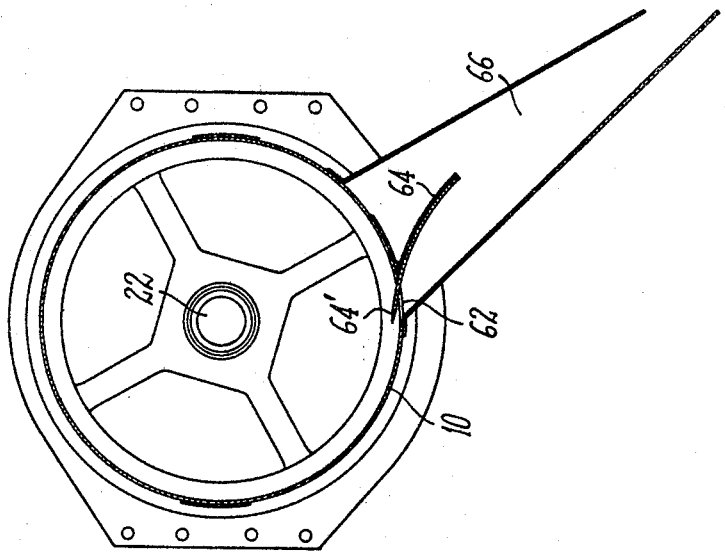
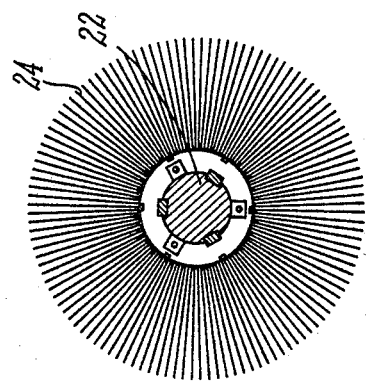
André Bonnet,
Inventor
By Wenderoth, Lind & Ponack,
Attorneys United States Patent Office 3,480,142
Patented Nov. 25, 1969

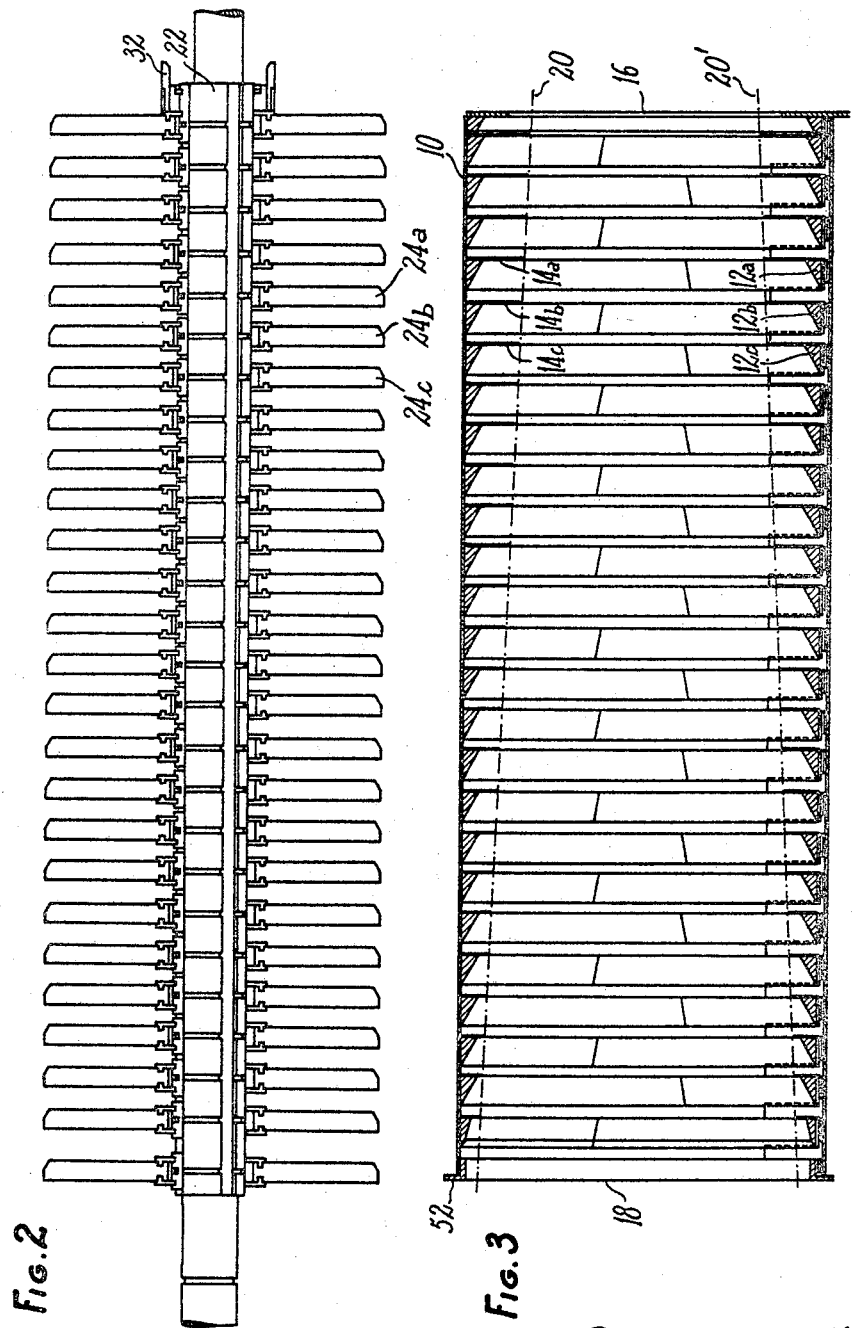

3,480,142
METHOD AND APPARATUS FOR PNEUMATICALLY SEPARATING SOLID PARTICLES
André Bonnet, Vincennes, France, assignor to
Société Aria, Paris, France
Filed Nov. 28, 1966, Ser. No. 597,433
Claims priority, application France, Dec. 21, 1965,
43,128
Int. Cl. B07b 7/01, 4/08
U.S. Cl. 209—133      15 Claims

ABSTRACT OF THE DISCLOSURE

A method and apparatus of continuous dry fractionation or classification of pulverulent products, which consists in maintaining in a stationary cylindrical casing a continuous flow of air having a predetermined axial velocity at all points, in combination with a constant angular velocity about the axis of said casing, in releasing at substantially zero axial velocity and at said angular velocity, from a particular cross section, and at a particular distance from the axis, of said casing, particles of the pulverulent dry product to be fractionated or classified.

---

The present invention relates to the continuous dry fractionation of flours and other pulverulent substances with a view to prepare on a commercial scale from a single source of pulverulent substances a plurality of products differing by their physical and/or chemical characteristics and properties.

Hitherto known commercial methods and devices proposed to this end operate according to the discontinuous or batchwise fractionation process whereby the fractionating operations must be repeated several times with a same batch of pulverulent product in order to increase the number of fractions of the desired products.

Therefore, to avoid the drawbacks, characterising known commercial fractionation methods and devices, the present invention provides a novel method and a novel classifier capable of performing on a commercial scale and as an interrupted process a continuous fractionation, this method being referred to hereinafter as the "commercial and continuous classification or selection by air."

Before describing the method of this invention and the device for carrying out same the theoretical principles on which the present invention is based will be explained.

In the following description the units referred to are those of the C.G.S. system and although the numerical calculations given hereinafter relate more particularly to wheaten flour it is obvious that the method of this invention is also applicable to other pulverulent products with which discontinuous classifiers or selectors can be used.

The physical constants involved are as follows:

Volumetric mass of wheaten flour: $\rho_2 = 1.44$ gr./cc.
Volumetric mass of air: $\rho_1 = 0.0012$ gr./cc.
Dynamic viscosity of air: $\mu = 0.000\ 182$ poises It is assumed that a flour particle having a diameter D lies in an air whirl of zero radial speed but having an angular velocity of $\omega$ radians per second, at a radial distance R from the center of the air whirl.

The following two hypotheses may be admitted:

The flour particles revolve at the same angular velocity $\omega$ as the air whirl for they are entrained therein by mechanical devices creating connecting forces directly opposed to the forces of inertia resulting from the Coriolis accelerations.

The forces of inertias resulting from the accelerations caused by variations in the absolute value of the velocity of the flour particle are negligible in comparison with the centrifugal forces of inertia resulting from variations in the direction of the velocity of the flour particle.

Considering the two hypotheses set forth hereinabove, it is clear that the drag force F1 caused by the "sinking" of the flour particle in the air medium is directly opposed as far as the intensity and direction are concerned by the centrifugal force of inertia F2 applied to the flour particle and having the following value.

$$F2 = \frac{\pi D^3}{6} \cdot \rho_2 \cdot \omega^2 \cdot R$$

The force F1 due to the "sinking" of the flour particle in the air medium is caused by an air flow at a speed ($v$) about the flour particle under generally semi-turbulent flow conditions. Calculating the Reynolds number $Re$ actually shows that in most cases only one form of air flow about the flour particle under semi-turbulent flow conditions can be contemplated. In fact, at the different values which the diameter of a flour particle may assume a laminar or viscous flow can be obtained only at relative velocities between the air and flour which have very low or very high values, which in the present state of the technique would be extremely difficult to obtain on a commercial scale.

With an air flow under semi-turbulent conditions about the flour particle considered in this example the Newton number ($Ne$) found experimentally, in the hypothesis that the flour particles were assimilated to indeformable spheres, and except for experimental errors, is $$Ne = \frac{18.5}{Re^{0.6}}$$

according to Marcel Loncin.
The drag force F1 is expressed as follows:

$$F1 = \frac{18.5}{8} \cdot \pi \cdot D^{1.4} \cdot V^{1.4} \cdot \rho_1^{0.4} \cdot \mu^{0.6}$$

From the equality of the absolute values of F1 and F2 is appears that $$|\vec{F1}| = |\vec{F2}|$$

or $$\frac{\pi D^3}{6} \cdot \rho_2 \cdot \omega^2 R = \frac{18.5}{8} \cdot \pi \cdot D^{1.4} \cdot V^{1.4} \cdot \rho_1^{0.4} \cdot \mu^{0.6}$$

The relative velocity between the air medium and the flour particle being the variation in radius with time, it may be assumed that $$V = \frac{dR}{dT}$$

giving the following differential equation:

$$\frac{\pi D^3}{6} \cdot \rho_2 \cdot \omega^2 \cdot R = \frac{18.5}{8} \cdot \pi \cdot D^{1.4} \cdot \rho_1^{0.4} \cdot \mu^{0.6} \left(\frac{dR}{dt}\right)^{1.4}$$

The radius fraction constituting the travel of the flour particle as a function of time is thus a function $R = f(t)$.

Assuming that at the origin of time ($t = 0$) the flour particle were released at a point near the axis of the air eddy and at zero initial velocity, a specific solution of the differential equation given hereinabove is obtained:

$$R = D^4 \cdot \omega^5 \cdot t^{3.5} \left(\frac{\rho_2}{13.875 \cdot \rho_1^{0.4} \cdot \mu^{0.6} \cdot 3.5^{1.4}}\right)^{2.5}$$

By substituting numerical values, the following equality is obtained:

$$R = 14.681 \cdot D^4 \cdot \omega^5 \cdot t^{3.5}$$

Study of the movement of particles in an air whirl of zero radial velocity and moving along its axis.

If in a cylinder (or cylindrical envelope) an axial air flow is maintained at a constant axial speed V, the air contained in this cylinder already flowing at a likewise constant angular velocity ω, each elementary air volume will travel along a straight circular helix.

A flour particle released in the vicinity of the cylinder axis at zero initial axial speed, in the sense that the particles are merely dropped off the end of an introducing or conveying tube concentric with the axis responsive to a rotary screw driving means therein, will travel along the radius of this cylinder according to a time function:

$$R=f(t)$$

This function, considering the hypotheses that the angular velocity of air and the angular velocity of the particle are tied to each other, and that only the drag force and the forces of centrifugal inertia which act upon the flour particle have a preponderant role, is as follows:

$$R=14.681 \cdot D^4 \cdot \omega^5 \cdot t^{3.5}$$

Under given operating conditions, the diameter D of the flour particle and the angular velocity ω of this particle are constants, whereby the fraction of the radius along which the particle has traveled as a function of time is:

$$R=Kt^{3.5}$$

(K being a constant).

At the limit, this flour particle attains the cylinder constituting the envelope and is deposited thereon.

Examining the function $R=14.681\cdot D^4\cdot \omega^5\cdot t^{3.5}$ will show that the time required for a flour particle to travel along the cylinder radius is subordinate to the diameter D of this particle. Now as the axial component (V) of the air speed is constant, the axial component of the particle speed will also tend to attain very quickly this same value V. As a result of these two remarks, if under predetermined operating conditions particles of different diameters are released from a same point adjacent the cylinder axis and without any initial axial speed, in the sense that the particles are merely dropped off the end of an introducing or conveying tube concentric with the axis responsive to a rotary screw driving means therein, particles having the same diameter will be deposited on each one of the serially arranged cylinder cross-sections to be known as collection zones. Thus, a continuous classification is effected.

Linearity of a continuous classifier

The aforesaid function 4:

$$R=14.681\cdot D^4\cdot \omega^5\cdot t^{3.5}$$

giving for a certain mode of operation of the classifier the radial travel of a particle having a diameter D as a function of time *t*, shows that the time required for the flour particles to deposit themselves on the cylindrical envelope of the classifier, that is, for travelling through the same radial distance, is is a function of the fourth power of the diameter of each particle.

As a result, the continuous classifier is definitely not linear, the large particles depositing immediately as they enter the classifier, and as far as the finer substances are concerned a reduction, even moderate, of the diameter D of the particles to be classified is attended by a strong reduction of the term $D^4$, thus involving an abnormally long classifier in order to obtain the deposit of fine particles on the envelope.

According to this invention the continuous classifier is made more linear by replacing its cylindrical envelope by a conical envelope. The inlet for the products to be fractionated as well as the inlet for the axial air stream are disposed at the minor base of the cone formed by the envelope of the classifier according to this invention. In fact, this classifier is more linear, the time required for a given particle to travel through a given axial distance being longer because the axial velocity of the particle constantly decreases if the conventional cylindrical envelope of the continuous selector is replaced by a conical envelope of which the small base is equal to the cylinder base; for a given particle and a given angular velocity the additional radial travel performed by the flour particle after having traveled through the same axial distance of the continuous conical-envelope selector is proportional to the power 3.5 of the new time value, and calculus will prove that in this last case the new value of the radial distance which the flour particle is expected to cover is greater than the actual increment in the radial travel which is due to the conical configuration of the continuous selector envelope, so that in this last case the particle will deposit itself on the conical envelope after having covered a shorter axial distance.

Therefore, it is the object of the present invention to render both commercial and continuous in time the operation of a continuous air-stream classifier. This invention consists in maintaining in a cylindrical or conical casing an axial air stream having a permanent axial velocity at all points and, in addition, a constant angular velocity about the axis of said casing, in releasing flour particles of different diameters at substantially zero initial velocity, normally to a same cross section coincident if desired with the minor base of the conical casing, and at the same distance from the axis of said casing. Since these flour particles, from the very moment they enter the continuous selector, have an axial component of their general velocity which rapidly tends to equal the axial component of the air stream velocity, and since the flour particles, due to the fact that their angular velocity is related to the air stream velocity, impinges against the inner casing wall after a time subordinate to their diameter, it is clear that flour particles having the same diameter are deposited on each one of the successive cross-sections of the casing.

The term "cross-section" as used herein designates sections made at right angles to the axis of the continuous selector and which serve as successive collection zones for the particles.

The method of rendering commercial and continuous in time the operation of a continuous air-stream classifier according to the present invention consists in initially introducing and subsequently maintaining the flour particles of a same diameter on the same cross-section of the casing as that whereon they are deposited at the end of their classification, by means of linking forces parallel to the axis; subsequently exhausting from the casing of the continuous selector the flour particles after the selection thereof, through apertures formed in the wall of said casing.

The flour particles of same diameter continue to revolve at the same angular velocity and on the same casing cross-section where they are deposited at the end of their classification. According to this invention the flour particles are exhausted from the continuous selector through the aforesaid casing apertures after the classification of these particles by creating air pressures as similar as possible on the inner and outer faces of the casing of the continuous selector, whereby the flour particles having a density greater than air are discharged through the apertures of the selector casing due to the centrifugal forces of inertia, and the air output through these apertures is reduced accordingly.

The fact that the flour particles of a same diameter continue to revolve at the same angular velocity as during the classification and on the same casing cross-section enables these particles, according to the present invention, to store sufficient kinetic energy to expel them from the classifier with the assistance of properly set shutters projecting slightly into the envelope and adapted to modify the path of the flour particles.

The method of classifying flour particles by means of a continuous air stream is rendered commercial and continuous in time according to the present invention by evacuating the flour particles as they are classified. To this end and according to this invention the air pressures exerted on the inner and outer faces of the casing are as close as possible to each other and, after their classification, the flour particles having a density greater than air are discharged from the casing under the combined action of their centrifugal force of inertia and their kinetic energy.

Moreover, this invention provides an improved device for carrying out the method set forth hereinabove.

The device according to this invention comprises a fixed cylindrical casing having at one end means for introducing an air stream according to a permanent flow rate and other means for introducing flour into said casing normally to a same cross-section thereof along a constant radius and at a constant angular velocity; means for imparting a certain angular velocity of constant vaue to the air-flour mixture already flowing at a certain axial velocity, means for evacuating the air at the outlet of said casing, and means for collecting along the casing wall and along the entire length thereof the flour particles deposited thereon, the diameter of these deposited particles decreasing from the casing inlet to the casing outlet due to the fact that the flour particles are entrained by the axial air stream at an axial velocity substantially equal to the air stream velocity, and that the same flour particles have to travel along one fraction of the radius of said casing during a time subordinate to the particle diameters, whereby all the four particles deposited on a same specific cross-section of the casing or envelope have the same diameter.

According to a specific feature characterizing this invention, said casing is provided with a plurality of internal annular diaphragms, forming collection zones of which the inner radius increases progressively and gradually from the air inlet, whereby the volume in which the air stream travels along the casing has a conical configuration, the minor base of the cone being adjacent the inlets for the air and for the products to be classified, so that the axial velocity of the air stream at the casing inlet is greater than the axial velocity of the air stream at the outlet end of the casing.

According to this invention the means for introducing air having a predetermined axial velocity into the casing consist of one or a plurality of frustoconical nozzles supplied with compressed air through any suitable means such as fans, pumps, blowers or the like, which are mounted on an air induction case attached to the inlet portion of said casing.

Said air induction case on which the nozzles for blowing air into the casing are mounted comprises movable shutters adapted to be set at will in the desired angular position for altering the direction of flow of the incoming air stream fed into the casing through said nozzles.

According to another feature of this invention the means provided for imparting a constant angular velocity to said air stream and to said flour particles introduced into said casing consist of a turbine of which the axis is coincident with the casing axis, said turbine having a relatively great number of blades disposed in said casing between said diaphragms.

According to this invention, the means for introducing flour particles of different diameters into said casing consist of a hopper or like means supplying an induction duct concentric to the shaft of said turbine in said air-stream induction case, and of at least one or more helical threads solid with or formed on said shaft and underlying the inner end of said hopper or the like so as to force the flour particles into said induction duct and subsequently into said casing.

Said means for permitting the escape of air from the casing consist on the one hand of a main outlet comprising one or a plurality of nozzles mounted on a air exhaust case, which communicates with the case zone adjacent to the axis thereof through an annular section coaxial thereto and positioned at the end of said casing, and on the other hand of a secondary outlet comprising one or a plurality of nozzles mounted on said air exhaust case, which communicates, with the volume disposed between the two or more annular diaphragms nearest to the air exhaust end of said casing.

The aforesaid main air outlet communicates on the one hand with an adjustable orifice communicating in turn with the atmosphere and on the other hand with the suction orifice of a fan, pump or like apparatus adapted to force air through the selector casing inlet to obtain the axial air stream speed necessary for affecting the desired selection. One fraction of the air necessary for the selection or fractionation process is thus recycled.

The so-called secondary air outlet communicates through an adjustable orifice with the suction orifice of a fan, pump or the like which is adapted to draw air from between the diaphragms of the casing which are adjacent to the casing end and to force this air through a cyclone or filter adapted to extract the fine particles to be selected which, due to their their high degree of fineness, did not deposit themselves between the other diaphragms. After filtration of the fine particles, the air thus drawn through the so-called secondary outlet is vented to the atmosphere.

According to a further feature characterising this invention, the means for collecting the flour particles deposited on the casing and distributed with decreasing diameters from the inlet to the outlet of said casing consist of a plurality of slots formed along one or more generatrices of the casing, each slot being disposed between a pair of adjacent diaphragms, each slot opening into a flour discharge spout, each spout comprising a curved fixed deflector plate protruding slightly into the casing through the slot associated therewith in order properly to guide the flour particles to be collected in said spout.

The flour particles having substantially the same diameter, which after their classification revolve against the inner face of the continuous classifier casing and between two adjacent annular diaphragms, may be extracted according to the essential methods contemplated according to this invention by properly adjusting diaphragms mounted to this end on the air paths or circuits externally of the selector, such that the pressures prevailing across the flour outlet slots be as close as possible on the two faces of the casing, this arrangement causing the flour particles denser than air to be discharged through the orifices of the external casing of the continuous selector under the influence of the centrifugal forces of inertia. According to the present invention, said fixed deflector plate disposed across the outlet slots and protruding slightly into the casing are adapted to alter the path of the flour particles which, due to their kinetic energy, are thus expelled from the continuous classifier.

Other features and advantages of this invention will appear as the following description proceeds with reference to the attached drawings illustrating diagrammatically by way of example a typical form of embodiment which should not be construed as limiting the field of the present invention since many modifications and variations may be brought thereto without departing from the spirit and scope of the invention.

In the drawings:

FIGURE 2 is an elevational and sectional view of the turbine of the classifier shown in FIGURE 1;

FIGURE 3 is a longitudinal section of the casing of the classifier shown in FIGURE 1;

FIGURE 5 is a section taken at right angles to the axis of the turbine shown in FIGURE 2;

FIGURE 6 is a vertical end view of a cross-section showing a flour discharge slot element;

FIGURE 7 is a perspective view of the discharge case with the air exhaust nozzle and the suction nozzles, and FIGURE 8 is a perspective view showing the air inlet case with its nozzles.

Throughout the figures of the drawings similar parts are designated by the same reference numerals.

Figure 1:
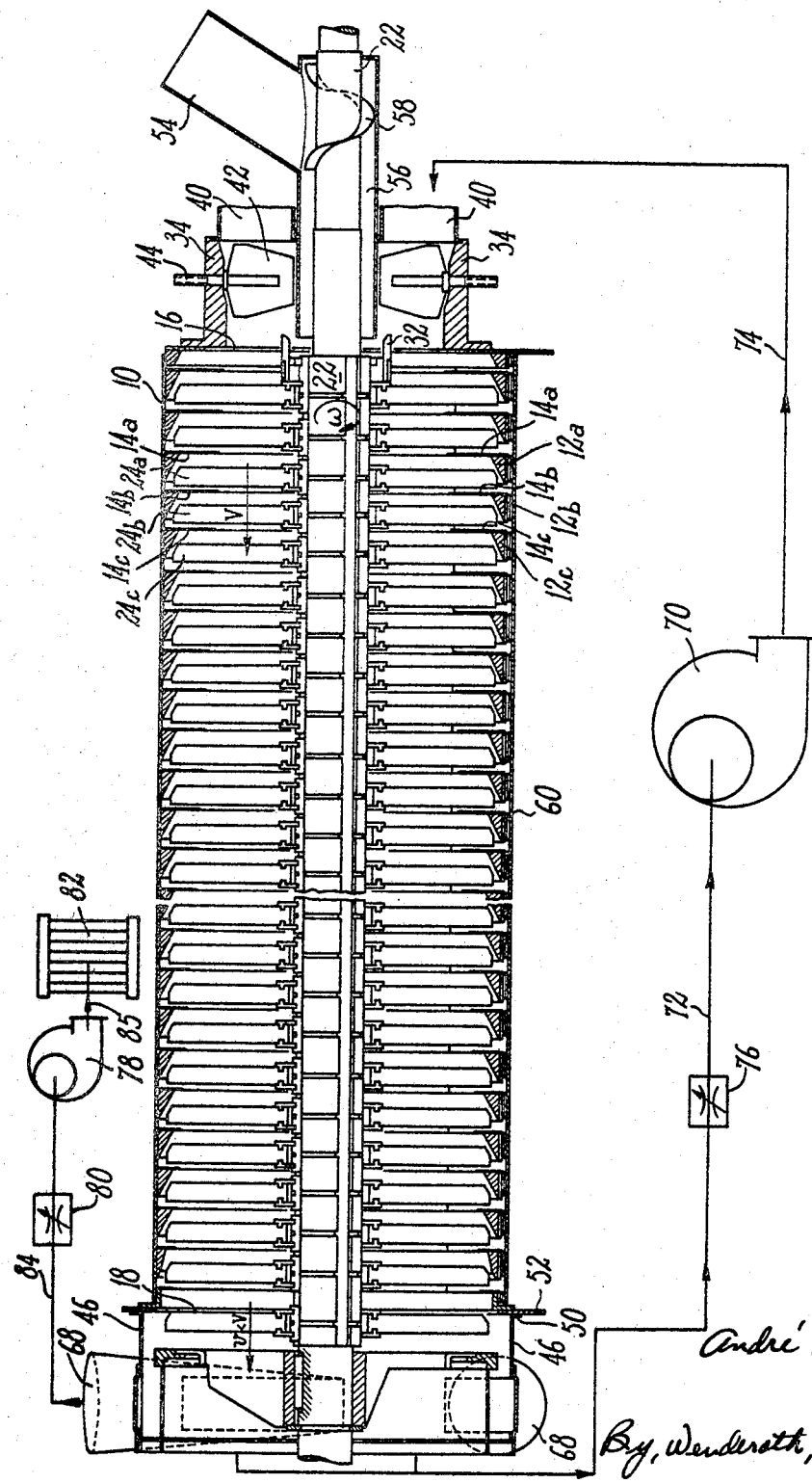
FIGURE 1 is a longitudinal section showing a continuous classifier for carrying out the method of this invention.

The classifier according to this invention comprises (FIGURE 1) a cylindrical outer casing 10 of sheet steel or other suitable material, open at either ends. Inside this casing 10 are secured at spaced intervals ring members 12a, 12b, 12c . . . carrying corresponding annular diaphragms 14a, 14b, 14c . . . of which the inner radii decrease gradually from the inlet aperture 16 of casing 10 to the outlet aperture 18 thereof, so that the cross-sectional passage area available for the air stream increases in the same direction. The minor base of the cone in which this air stream is created corresponds to the inlet 16 for the air stream and the products to be classified (as will be described presently) so that the axial velocity V of this air stream at the inlet end of casing 10 is greater than the axial velocity $v$ at the outlet end 18, in accordance with the theoretical data set forth hereinabove.

In FIGURE 3 illustrating separately the casing 10 and its diaphragms, the taper resulting from this diaphragm arrangement is clearly shown by the chain-dotted lines 20, 20'.

Figure 4:
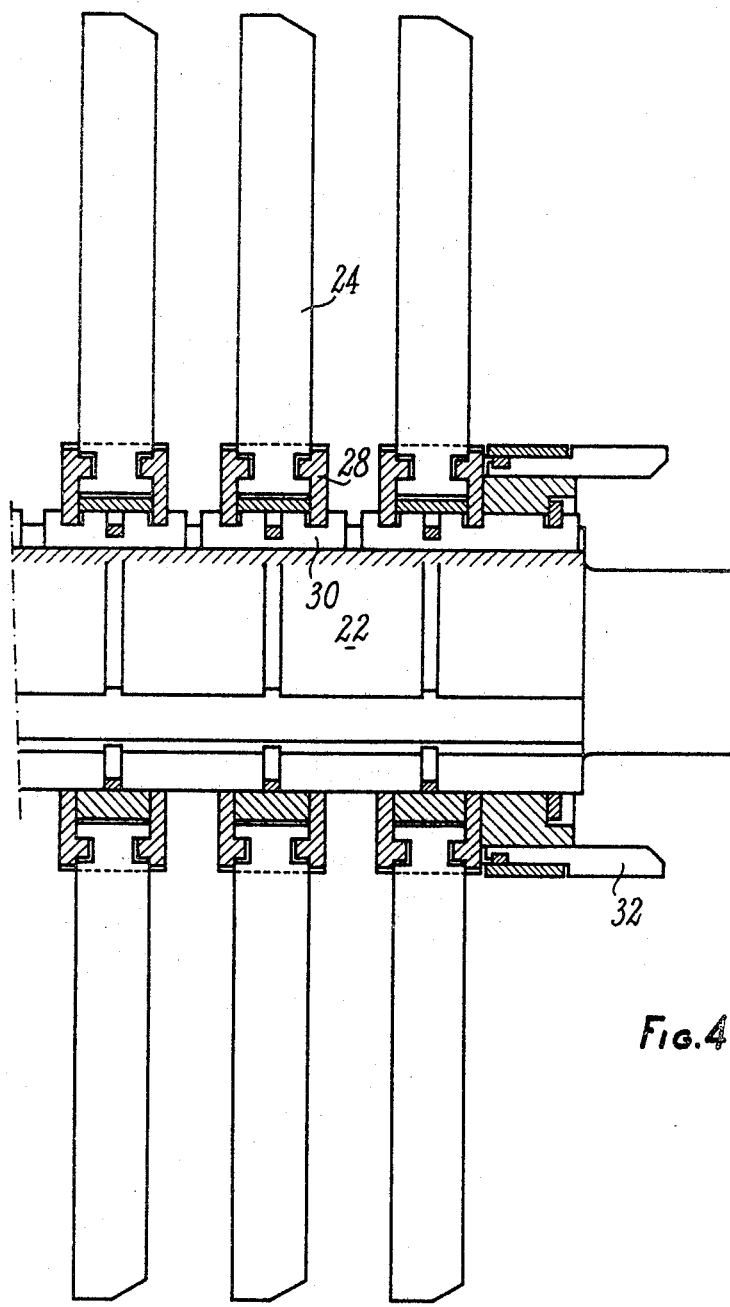
FIGURE 4 is a fragmentary view showing on a larger scale a detail of the turbine of FIGURE 2, and illustrating in fragmentary vertical section the manner in which the roots of the turbine blades are mounted in the turbine shaft.

Rotatably mounted in the casing 10 is a turbine having its shaft 22 coaxial therewith provided with a great number of blades 24a, 24b, 24c . . . interposed between the diaphragms 14a, 14b, 14c . . . FIGURE 2 shows the turbine alone and FIGURE 4 illustrates on a larger scale a detail of this turbine in order to evidence the mounting of the blades such as 24 on shaft 22.

The turbine blades (24) having their plane coincident with the axis of shaft 22 are mounted in a milled hub and retained by flanges 28 fitted in turn in the grooves of captive keys 30. Moreover, this shaft 22 carries on its end adjacent the inlet aperture 16 of casing 10 a number of small horizontal blades 32 so that when the flour penetrates into the classifier it is carried around at the same angular velocity as the turbine.

Mounted on the inlet end 16 of casing 10 is the air inlet case 34 shown in perspective view in FIGURE 8. This case 34 is mounted on the outer face of the casing by means of a flange 36 secured by means of screws, bolts, rivets or the like to the casing 10.

The inlet case 34 comprises a number of frustoconical nozzles such as 38 (FIGURE 8) for directing air into the casing 10. The inner ends of these nozzles 38 open at 40 into the inlet case 34. This case 34 further comprises a number of adjustable shutters such as 42 adapted to be controlled for example by means of a control handle 86 for rotating the square-sectioned stub shafts 44 on which the shutters are mounted. The air entrained by any suitable device such as pump, fan, blower, etc., is forced through the nozzles 38 and penetrates into the case 34 through ports 40, and the properly set shutters 42 direct the incoming air stream into the casing 10 of the classifier at the desired axial speed; moreover, the turbine revolving within the casing 10 imparts to this air stream a constant angular velocity as it enters the casing 10.

Mounted at the outlet end 18 of casing 10 is an air exhaust case 46 comprising on the one hand main exhaust nozzles such as 48 communicating through an orifice with the zone adjacent to the axis of said case, and on the other hand exhaust and secondary suction nozzles such as 68 for discharging the air together with the flour fines which did not previously deposit themselves on to the inner wall of the casing on account of their extreme fineness, these exhaust and secondary suction nozzles 68 communicating with the internal portion of the casing located between the diaphragms nearest to the outlet end of said casing. This case 46 is mounted on the end 18 of casing 10 for example by having its flange 50 bolted to the registering flange 52 of the casing end portion.

The flour to be fractionated or classified is introduced into the classifier at a substantially zero or relatively low initial axial speed and close to the turbine shaft 22 which, as already explained, is concentric to the axis of the classifier. The flour particles of different sizes are fed to the spout or hopper 54 and directed thereby into an inlet duct 56 concentric with shaft 22 and mounted in the air inlet case 34. One or more helical fins or ribs 58 secured, welded or formed on the end portion of the turbine shaft 22 inside said duct 56 and beneath said spout or hopper 54 force the flour particles through the duct 56 where they merely drop off at said substantially zero or relatively low axial speed into the casing 10.

As already explained in the preamble of this specification with reference to the theoretical principle of the continuous clasification process of this invention, the flour particles (like the air in which they are kept in suspension) have an axial speed corresponding to a permanent flow and a constant angular speed. As also explained in the foregoing, flour particles of gradually decreasing diameter from inlet to outlet are deposited on to each cross-section of the casing, for under these specific conditions of operation of the selector these particles released in the selection zone normally to a same cross-section and at a same radius have to travel along a certain radial distance, before depositing themselves on to the casing wall, in a time proportional to the diameter of said particles.

The particles collected on each cross-section of the casing have the same granulometry, the larger particles being collected from the very inlet of the classifier.

As already explained hereinabove due to the tapered configuration of the passage provided for the air and flour flow through the casing by the diaphragms 14, the axial velocity of this flow through the classifier, from inlet to outlet, is reduced so as to partially correct the absence of linearity of the classification obtained with a continuous selector.

The flour particles deposited on each cross section of the casing 10 of this classifier are discharged alone one or more generatrices 60 of the casing through a plurality of slots disposed between the diaphragms 14 the latter of which help constitute the collection zones..

FIGURE 6 illustrates in cross-section the casing 10. In this figure, one of the slots 62 for discharging the flour particles from the casing 10 is clearly shown. This slot 62 opens for instance into a spout 66 provided with a curved deflector member 64 the inner end 64' of this deflector member projects slightly into the casing 10. This deflector member permits of modifying at will the path of the flour particles which, due to their inherent kinetic energy, penetrate into the spout 66. Of course, each slot such as 62 has associated therewith a shutter 64 and a spout such as 66 (or any other suitable means) for collecting the flour particles having the same size.

The axial air output necessary for classifying the flour particles is obtained by means of a fan 70 drawing air through the nozzles 48 from the duct shown diagrammatically at 72 and delivering this air through the nozzles 38 connected to the fan outlet leading into the duct shown diagrammatically at 74. An adjustable aperture 76 communicating with the atmosphere is provided in the walls of the suction duct shown diagrammatically at 72; the adjustable opening or closing of said aperture 76 permits of increasing or decreasing at will the air pressure in the classifier.

A fan 78 draws air through nozzles 68 from a duct shown diagrammatically at 84 and forces this air through the filter 82 capable of retaining the finest flour particles.

An adjustable diaphragm 80 disposed across the duct 84 permits of adjusting at will the pressure drop in the continuous selector as a consequence of the suction produced by said fan 78.

Due to the rotation of the turbine shown in FIGURE 2, the pressures are higher in the vicinity of the casing than in the central portion of the continuous classifier. A proper adjustment of the adjustable diaphragms 80 and aperture 76 is made with a view to render as close as possible the pressures acting upon the inner and outer faces of the cylindrical casing 10 of the continuous classifier during its operation.

When classified, the flour particles revolve along the casing 10 between the diaphragms 14. The fact that the pressures are substantially the same on the two faces of casing 10 causes not only the air output through the aforesaid slots 62 to decrease, but also the discharge, by centrifugal action, of the flour particles having a density greater than air.

Moreover, the provision of fixed, suitably positioned deflector or shutters 64 projecting slightly in the selector casing at 64' will modify the path of the classified flour particles entering the spout 66.

After their classification the flour particles are discharged from the casing by utilizing for all these particles the combined action of their centrifugal force and their kinetic energy.

As will clearly appear to anybody conversant with the art, the present invention provides a method of and a device for the continuous classification, on a commercial scale, of pulverulent products.

Thus, this invention should not be considered as concerning the classification of flour particles alone, as mentioned in the above example, since it may successfully be applied to the classification of particles of any other dry pulverulent products or substances.

What is claimed is:

1. A method of continuous dry fractionation or classification of the particles of pulverulent products having different diameters comprising the steps of:
   (a) introducing generally into one end of a stationary cylindrical casing, having a plurality of serially arranged zones of collection, a continuous flow of air;
   (b) maintaining said flow of air at a predetermined axial velocity at all zones throughout said casing in combination with a predetermined angular velocity thereof and about the axis of said casing;
   (c) releasing or introducing said product particles at a substantially zero initial axial speed from a particular cross-section and at a particular distance from the axis of said casing;
   (d) imparting the aforesaid angular velocity of said air stream to said product particles,
   (e) subsequently imparting to said particles at their ingress into said casing an axial component of velocity substantially equal to that of said air stream so that after a time the particles, depending upon the particle diameter, travel a certain radial distance within and around the casing before reaching an inner peripheral wall of said casing; and
   (f) collecting said particles of the same diameter along the inner periphery of the casing progressively in the respective zones of collection according to the different diameters, commencing with those of larger diameter.

2. A method according to claim 1 wherein said air is caused to travel through a volume substantially of conical configuration whereby the axial velocity of said air flow at the inlet end of said casing is greater than the axial velocity of said air at the outlet end of said casing, the inlet for said product to be classified as well as the inlet for said axial air flow being located at the minor base of said conical configuration and said products being released or introduced into said casing in a direction normal to the cross-section of said casing coincident with said minor base.

3. A method according to claim 1 wherein with the aid of spaced annular diaphragms disposed perpendicular to the axis of the casing to constitute the zones of collection, the further step of creating linkage forces parallel to the axis in order to maintain the particles having the same diameter on the same cross-section of said casing as the cross-section where they are deposited upon completion of the classification process, and then discharging said particles from the casing after their classification through orifices in said casing.

4. A method according to claim 3 wherein said classified particles are discharged through said orifices by creating on the inner and outer surfaces of said casing substantially equal air pressures so that particles denser than air may be discharged from said casing by the centrifugal force imparted to them and by virtue of their kinetic energy thereby reducing the air output through said orifices accordingly.

5. A continuously operable classifier apparatus comprising a stationary cylindrical casing having a plurality of collection zones or zones of selection throughout the length and having an inlet end and an outlet end, means at said inlet end of said casing for introducing a continuous air stream through said casing following a predetermined permanent flow pattern which creates an axial speed component of the air having a determined value for each of said zones of selection, means for introducing particles of a pulverulent product having different diameters into said casing in a direction normal to a given cross section thereof along a constant radius from the axis of said casing and at a constant angular velocity, means for imparting the constant angular velocity to said air stream, said latter means further maintaining said air and said pulverulent product particles at such constant angular speed, means in addition to means defining said collection zones for collecting on the inner wall and throughout the length of said casing product particles deposited thereon having particle diameters decreasing from the inlet end to the outlet end of said casing since said particles are entrained at an axial speed which is substantially equal to the axial component of said axial air stream and means for discharging said particles at said collection zones according to their respective diameters which particles travel in a given period of time a certain radial distance around said casing whereby particles having substantially the same diameter are received and collected on and discharged from the inner peripheral wall of said casing.

6. Continuously operable classifier apparatus according to claim 5 wherein said collecting zones of the fixed casing comprise a plurality of spaced internal annular diaphragms and the inner diameter of said diaphragms increases from said inlet to said outlet so that the volume through which said air stream travels in said casing has a substantially conical configuration with the minor base of the cone adjacent to said inlet for said air stream and said particles to be classified, whereby the axial velocity of said air stream at the inlet end of said casing is greater than the axial velocity of said air stream at the outlet end of said casing.

7. Continuously operable classifier apparatus according to claim 6 wherein said means for collecting the particles of pulverulent product deposited on said casing and distributed with gradually decreasing diameters from the inlet end to the outlet end of said casing, comprise a plurality of slots formed along said casing, each slot being disposed between a pair of adjacent annular diaphragms, a separate particle discharge spout into which each slot opens comprising a fixed, curved deflector member projecting slightly into said casing through the slot associated therewith in order to modify the path of the particles of pulverulent product and direct same to the outside of said spout under the action of the centrifugal force imparted to them and by virtue of their kinetic energy.

8. Continuously operable classifier apparatus according to claim 7 including duct means for circulating said air flow, said duct means leading from the outlet end of said casing and including a duct connected therefrom to the inlet end of said casing, adjustable diaphragms mounted upon the air circulating duct means exterior to said casing can selectively establish load losses in order to regulate the pressures at the exit slots of the particles to values as near as possible to atmospheric pressure to permit the discharge of particles substantially of the same diameter which, after their classification, revolve between two adjacent annular diaphragms against the inner surface of said casing, and also to reduce the air output through said slots.

9. Continuously operable classifier apparatus according to claim 5 wherein said means for introducing an air stream comprises a frustoconical nozzle and an air inlet case attached to said inlet end of said casing upon which said nozzle is mounted.

10. Continuously operable classifier apparatus according to claim 9 wherein said air inlet case comprises movable shutters for modifying the direction of flow of the air introduced into said casing through said nozzle.

11. Continuously operable classifier apparatus according to claim 5 wherein said means for maintaining the air and the pulverulent product particles at said constant angular speed comprises a rotor having a plurality of blades, a shaft for said rotor having its axis coincident with the axis of said casing and said blades being located in said casing between said diaphragms.

12. Continuously operable classifier apparatus according to claim 11 wherein said means for introducing said pulverulent product into said casing comprises an air inlet case mounted on said casing, an inlet duct concentric to said shaft of said rotor extending inside said air inlet case, a hopper to feed said inlet duct, and a plurality of helical ribs attached to said shaft disposed beneath said hopper for forcing said particles into said inlet duct and into said casing.

13. Continuously operable classifier apparatus according to claim 12 including means for exhausting the air from said casing, said exhausting means comprising a main outlet structure comprising an annular section coaxial with the axis of said casing located at the outlet end of said casing, an air outlet case having an outlet nozzle mounted thereon communicating with a zone of said casing which is adjacent to the axis thereof by means of said annular section, and secondary outlet comprising a nozzle mounted on said outlet case, said secondary outlet communicating with the volume defined by said annular diaphragms adjacent the outlet end of said casing.

14. Continuously operable classifier apparatus according to claim 13 wherein means are provided for drawing air from between the diaphragms of said casing which are closely adjacent to its outlet end and said secondary air outlet has an adjustable aperture communicating with the suction side of said means for drawing air, means for extracting the particles which were not deposited between said diaphragms on account of their extreme fineness, and means to facilitate the venting of said air drawn through said secondary outlet to the atmosphere after said fine particles have been extracted therefrom.

15. Continuously operable classifier apparatus according to claim 5 wherein said means for introducing the continuous air stream includes a suction side, and an adjustable aperture leading to the atmosphere is provided and said air outlet communicates with said aperture and with the aforesaid suction side to produce the air-stream axial velocity necessary for the classification thereby recycling a fraction of the air necessary for said classification.

References Cited

UNITED STATES PATENTS

| | | | |
|---|---|---|---|
| 696,606 | 4/1902 | Stebbins | 209—144 |
| 1,505,740 | 8/1924 | Stebbins | 209—144 |
| 3,135,684 | 6/1964 | Ackeret | 209—144 |

FRANK W. LUTTER, Primary Examiner

U.S. Cl. X.R.

209—144, 147, 153, 154